United States Patent [19]
Martinez

[11] Patent Number: 5,708,581
[45] Date of Patent: Jan. 13, 1998

[54] METHOD FOR MAXIMIZING FEEDFORWARD ORTHOGONALITY FOR MINIMIZING SERVO SYSTEM NULLER INSTABILITY

[75] Inventor: Boris N. Martinez, Boise, Id.

[73] Assignee: Hewlett-Packard Company, Paol Alto, Calif.

[21] Appl. No.: 679,163

[22] Filed: Jul. 12, 1996

[51] Int. Cl.$^6$ ............................................. G05D 3/12
[52] U.S. Cl. .................. 364/164; 364/165; 360/77.02; 360/77.04; 360/78.04
[58] Field of Search ............... 360/77.01, 77.02, 360/77.04, 77.05, 77.06, 77.07, 75, 78.04, 78.09, 78.14, 46, 98.01; 331/1 R, 14, 25, 27; 364/164, 165

[56] References Cited

U.S. PATENT DOCUMENTS

| | | | |
|---|---|---|---|
| 4,369,441 | 1/1983 | Wohlmuth | 340/733 |
| 4,511,938 | 4/1985 | Betts | 360/77.08 |
| 4,578,723 | 3/1986 | Betts et al. | 360/77.08 |
| 4,775,903 | 10/1988 | Knowles | 360/78.07 |
| 4,914,725 | 4/1990 | Belser et al. | 318/560 |
| 5,090,002 | 2/1992 | Chow et al. | 369/44.28 |
| 5,585,976 | 12/1996 | Pham | 360/77.04 |

FOREIGN PATENT DOCUMENTS

| | | | |
|---|---|---|---|
| 03-192584 | 8/1991 | Japan | G11B 21/10 |
| 16314695 | 4/1973 | United Kingdom | G05D 1/00 |
| 1489078 | 10/1977 | United Kingdom | G05D 3/00 |

OTHER PUBLICATIONS

C. C. Liu, "Quad-Burst Servo Pattern", IBM TDB, vol. 22, No. 12, pp. 5436-5438, May 1980.

A. Malta, et al., "Track Servo System Compensating Pattern Defects", IBM TDB, vol. 22, No. 8A, pp. 3269-3270, Jan. 1980.

K. H. Schaller, "Phase and Location Coded Servo Pattern for Controlling the Magnetic Head in Track Seek and Track Follow Operations.", IBM TDB, vol. 20, No. 5, pp. 1792-1794, Oct. 1977.

J. C. Dennison, et al., "Rotating Record Disk Initialization for Sector Servoing", IBM TDB, vol. 20, No. 5, pp. 1789-1791, Oct. 1977.

R. S. Palmer, "Off-Track Gain Calibration of Position Error Signal", IBM TDB, vol. 20, No. 1, pp. 349-350, Jun. 1977.

A. J. Betts, "Null Servo Pattern", IBM TDB, vol. 18, No. 8, pp. 2656-2657, Jan. 1976.

R. K. Oswald, "Design of a Disk File Head-Positioning Servo", IBM J. Res. and Devel., pp. 506-512, Nov. 1974.

*Primary Examiner*—Emanuel T. Voeltz
*Assistant Examiner*—Cuong H. Nguyen
*Attorney, Agent, or Firm*—Lane R. Simmons

[57] ABSTRACT

An n-around nuller in a disk drive track-follow loop servo system is optimized by maximizing its feedforward orthogonality (channel separation). Sine and cosine terms (signals) are injected into the track-follow loop, thereby creating the separate channels (signals), to reduce the amplitude of the n-around component. The Fourier sum is then taken in connection with a phase delay variable and integrated to produce the proper feedback for maximizing orthogonality and minimizing instability. Specifically, the feedforward cosine term is low-pass filtered to find its average value. A step is then fed into the feedforward sine term and the response of feedforward cosine is observed. Feedforward cosine is then integrated to evaluate how much "cross talk" there is between the two channels. Once the integral sum is found, it is used as a feedback element for tuning the sine and cosine terms injected into the channels, thereby maximizing feedforward orthogonality and minimizing servo system nuller instability.

22 Claims, 5 Drawing Sheets

METHOD FOR MAXIMIZING FEEDFORWARD ORTHOGONALITY FOR MINIMIZING SERVO SYSTEM NULLER INSTABILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates in general to computer disk storage technology and, more specifically, to a disk drive servo system and method for controlling positioning of a read/write head over a desired track on a rotating disk storage device.

BACKGROUND OF THE INVENTION

Conventional disk drives employ a support arm for carrying read/write heads over tracks on the disk drive surface to read and write data between the heads and tracks. A read/write head may also be used as a "servo" head for reading servo (track positioning) information. The support arm is actuated by a servo motor. A closed loop servo control system controls activation of the servo motor for regulating positioning of the support arm and read/write/servo heads over tracks on the disk drive surface. The servo control system receives a reference signal from the servo head (i.e., the read write/head being used for reading servo information) indicating off-track servo position information of the servo head (and read/write heads) over the disk surface. The closed loop servo control system implements and corrects rotational positioning of the servo head by inputting a signal to the servo motor in response to the off-track position information produced by the servo head relative to the desired track. The control loop system tries to minimize any off-track or radial displacement between the head and track.

In order to accurately control positioning of the heads over data tracks on the disk surfaces, the closed loop servo control system should be able to accurately produce a stable and controlled steady-state error signal indicative of positioning of the heads with respect to a desired track of servo information, enabling smooth and accurate rotational control of the servo motor in a dynamic manner while reading and writing from surfaces of a disk. Additionally, timing signals can be provided by the servo information being read by the servo head since the hard disks typically rotate at a known speed which proves critical in choreographing timing and indicating status of both the servo system and the read/write system.

One problem associated with disk drives relates to lateral wobbling of the rotating hard disks due to imperfect rotation, vibrations, random noise, and thermal effects. The main problem, referred to as "runout", is caused from circular storage disks being slightly decentered from their optimal axis of rotation, thus allowing the disks to move laterally in a back and forth pattern. There are two key problems caused by runout: when writing servo information onto a rotating disk, the wobbling can produce an acircular track of information that is hard to read, which becomes difficult for a servo control loop to dynamically control if the servo gain variation becomes too great when directing activation of a servo motor to accurately position servo/read/write heads over a desired data track being followed. The other problem is caused when the disk drive containing the prerecorded servo position information is driven in rotation which can induce a separate wobbling of the disks during a read/write phase of operation, making it difficult for the control system to track the information which has often already been recorded as an acircular track. In this manner, runout is caused during a read/write portion which is superposed over runout that has already manifest itself as an acircular track of servo position information earlier recorded onto the disk surface.

Runout is generally classified as either repeatable runout, or non repeatable runout. Non repeatable runout is non synchronous with rotation, and is characterized by various asynchronous system inconsistencies or mechanical defects. In contrast, repeatable runout is synchronous with rotation, namely, that runout associated with the integer harmonic (i.e., 120, 240, 360 Hz, etc.) of the revolutions per minute (RPM) of the disk. Repeatable runout is characterized once the servo code is written to the disk, and is defined by the number of occurrences of significant runout within one revolution of the disk. The number of occurrences is defined as an "n-around" component. For example, a "once around" runout (or wobble) is indicative of a significant runout occurring once during a single revolution. A "once around" is commonly caused by a flawed or worn spindle/bearing structure. As another example, an "eight around" is indicative of a significant runout occurring eight times during a single revolution. An "eight around" can occur with certain types of spindle construction, and may occur, for example, in connection with an eight pole motor.

Conventional servo systems improve tracking by various methods, including using servo control loop compensators and/or nullers. Compensators and nullers are typically implemented in firmware. In general, compensators approximate a desired tracking response by shaping the magnitude and phase characteristics of the summation of a plurality of signal frequencies affecting the servo system (such as signals caused by repeatable runout, non repeatable runout, noise, etc.). On the other hand, nullers improve tracking by managing a specific signal frequency, i.e., a specific n-around component, directly related to an identified harmonic (i.e., "once around", "eight around", etc.).

Given the foregoing, there is a continuing need to monitor and control servo system control loops to prevent signal instability in the loops and to maintain accurate servo positioning. Accordingly, an object of the present invention is to provide a system and method for optimizing a nuller to avoid control loop instability and to improve tracking.

SUMMARY OF THE INVENTION

According to principles of the present invention in a preferred embodiment, an n-around nuller in a disk drive track-follow loop servo system is optimized by maximizing the nuller's feedforward orthogonality (i.e., its channel separation). Sine and cosine terms (signals) are injected into the track-follow loop, thereby creating the separate channels (signals), in order to reduce the amplitude of the n-around component. The Fourier sum is then taken in connection with a calculated phase delay variable and integrated to produce the proper feedback for maximizing orthogonality and minimizing instability. Specifically, a feedforward cosine term for one channel is low-pass filtered to find its average value. A step is then fed into a feedforward sine term of the other channel and the response of feedforward cosine is observed. Feedforward cosine is then integrated to evaluate how much "cross talk" there is between the two channels. Once the integral sum is found, it is used as a feedback element for tuning the sine and cosine terms injected into the channels, thereby maximizing feedforward orthogonality and minimizing servo system nuller instability.

Other objects, advantages, and capabilities of the present invention will become more apparent as the description proceeds.

DETAILED DESCRIPTION OF THE INVENTION

Figure 1:
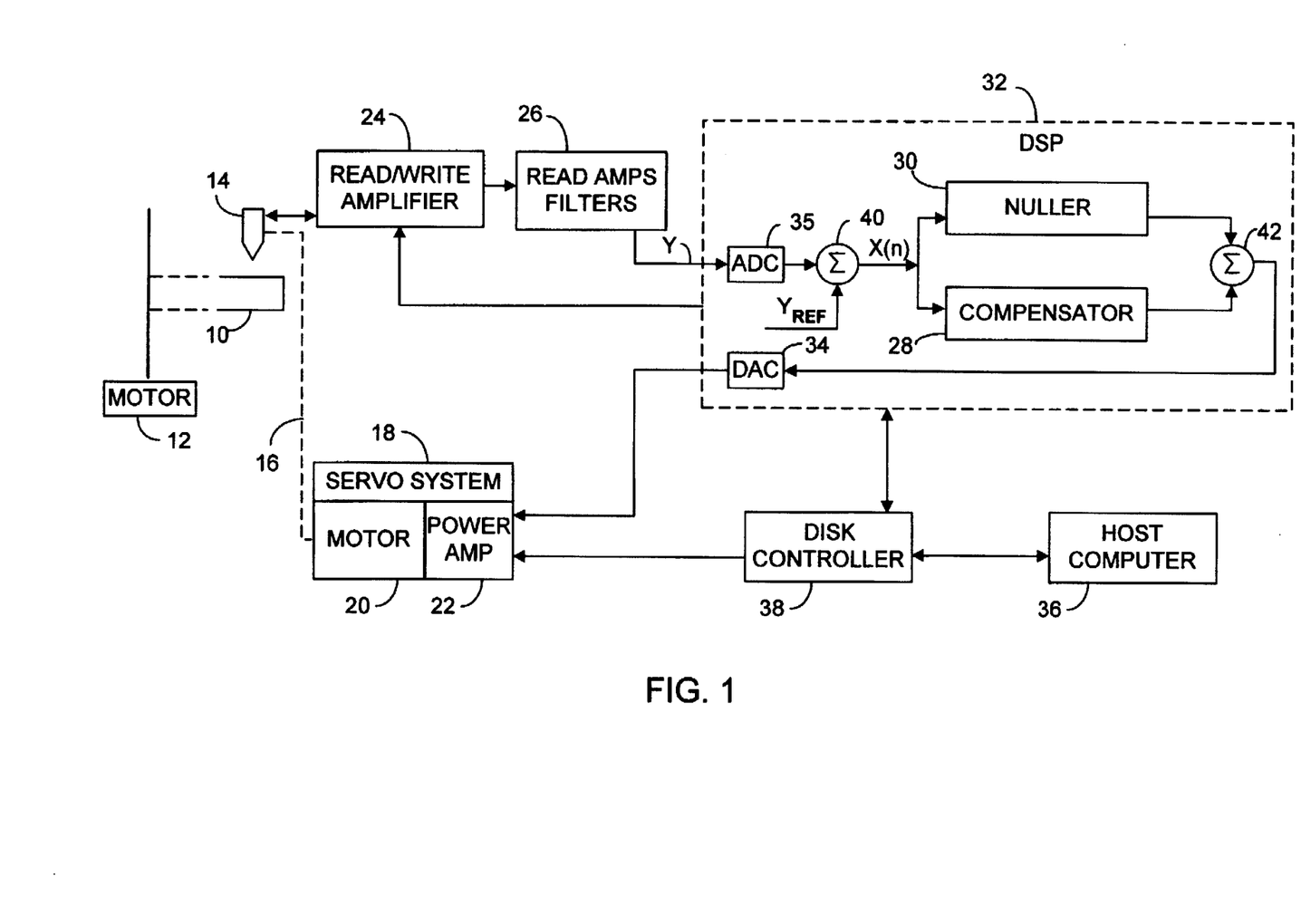
FIG. 1 is a high level schematic block diagram of a disk drive servo system embodying the present invention nuller optimization means and method.

FIG. 1 is a high level schematic block diagram of a disk drive servo system embodying the present invention means and method for optimizing a nuller signal. A rotatably mounted disk (stack) 10 is powered by motor 12 to be driven at a constant rpm. A transducer (read/write/servo head) 14 is positioned by a movable actuator 16 at different radial locations over the adjacent surface of disk 10 by means of a servo system 18. Such a servo system for the purposes of this description comprises at least motor 20 which is powered by power amplifier 22. The position of the head 14, with respect to the center of a recorded track, is detected by the head from servo code recorded in that track. As is well known, such servo code may be embedded or sampled servo in each track, or may be servo code on a dedicated servo disk surface. The servo motor 20 is part of a servo loop which includes head 14, and conventionally includes read/write amplifier 24, read amplifiers and filters 26, digital signal processor (DSP) 32, and power amplifier 22.

Digital signal processor (DSP) 32 controls the servo loop for positioning actuator 16 over disk 10 for reading/writing purposes. As is well known in the art, DSP 32 includes digital to analog converter (DAC) 34, analog to digital converter (ADC) 35, compensator 28, and nuller 30. Compensator 28 and nuller 30 are shown as discrete blocks for clarity and simplification of the diagram. However, it is obvious to one of ordinary skill in the art that compensators and nullers are typically implemented in firmware that is executed by the DSP, as in a preferred embodiment of the present invention.

It is the job of the DSP to move the actuator from one position to another, and, once in a desired position, to maintain that position. This is accomplished by constantly monitoring the actual position, comparing it to the desired position, and then writing a correction value to control servo system 18.

In the situation where a single head 14 transduces both embedded servo code and data in particular tracks, the system functions in the track following mode in servo code sectors, and in the data reading/writing mode in the data sectors. In such a system, requests for information by a host computer 36 are transformed by a disk controller 38 into track identity and track sector signals. In the presence of such requests, the system functions in the seek mode of operation and radially positions head 14 at the center of the selected track and reads/writes the data when the selected sector in that data track passes beneath the head. To this end, DSP 32, receiving data from read amplifier 24 and filter 26, is bi-directionally coupled to disk controller 38 so that data addresses, data to be encoded, data being read out, and read/write controls may be passed therebetween. Data which is read out is coupled by disk controller 38 to host computer 36 as the data requested by the host computer. Where data is to be written onto the disk, such data from the host computer is designated for track and sector location on the disk by disk controller 38 and transmitted also to DSP 32 to be coupled to head 14 via read/write amplifier 24 when head 14 is in the designated sector of the selected track.

In any disk recording and reproduction system, an objective of the servo system which controls the radial position of the transducer 14 on disk 10 is to keep the transducer 14 over the pre-defined track center. In a disk drive system as shown, this is done as the transducer 14 reads position information from a track in the surface of the disk 10 as the disk rotates. This position information is then used to develop a position error signal Y. The error signal is converted to a digital signal via ADC 35, summed 40 with a desired position reference signal $Y_{REF}$, fed back (as signal X(n)) through compensator 28 and nuller 30 (of DSP 32), and then summed 42 and fed as a feed forward signal in the servo feedback loop through DAC 34 to control servo system 18 and to move the transducer 14 in a direction to reduce the error. Thus the feedback loop for the servo system during the track following mode of operation is responsive to the track position error signal Y, and all corrections are to reduce the magnitude of the position error to maintain the transducer essentially in a track centered position.

The system thus far described is conventional. However, the present invention is employed in connection with nuller 30. Specifically, nuller 30 provides a means and method for minimizing nuller instability.

Figure 2:
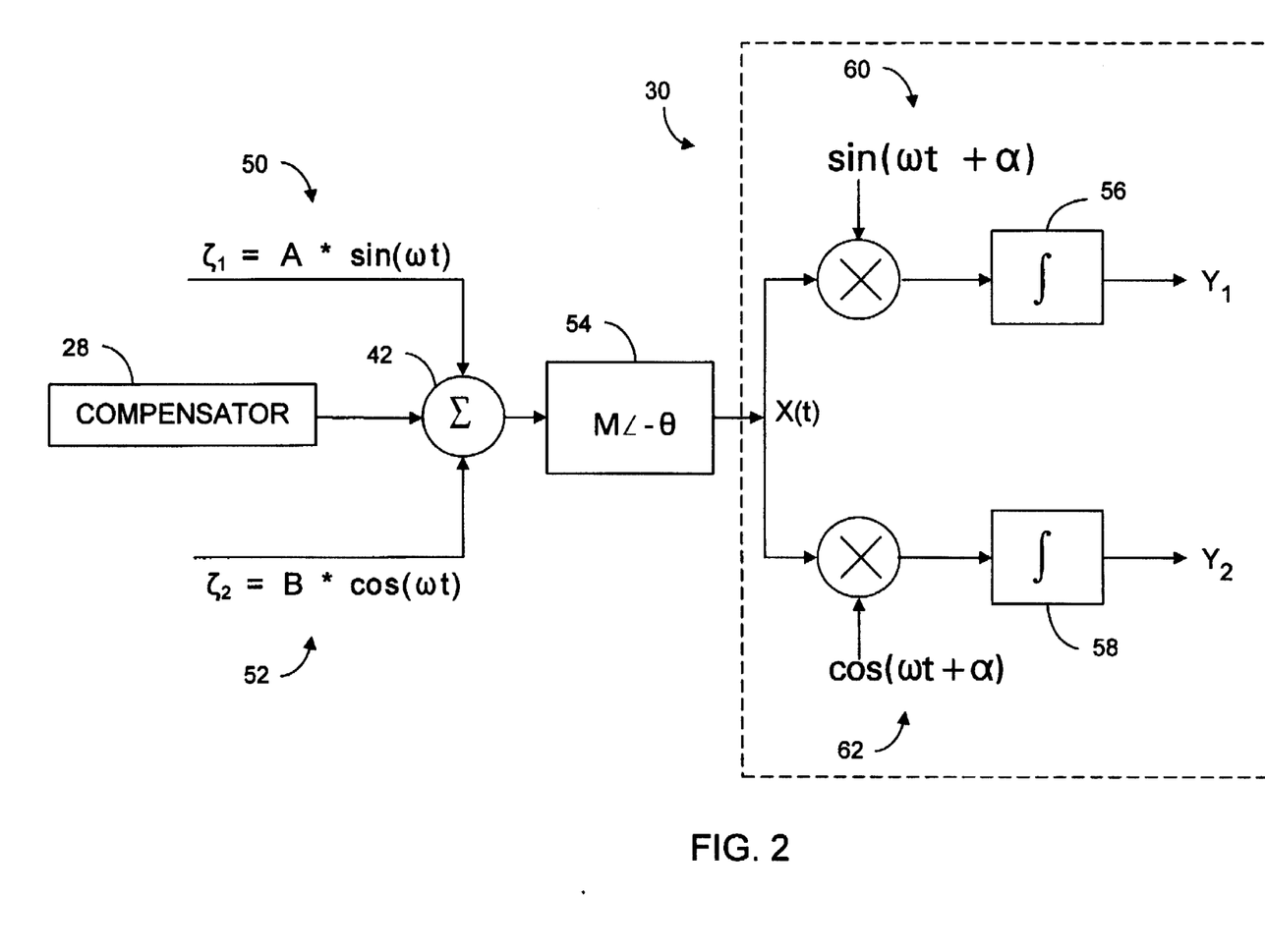
FIG. 2 is block diagram of a nuller embodying the present invention, depicted in analog form.

Referring now to FIG. 2, a schematic block diagram shows a representative portion of the servo control loop in connection with nuller 30 (of FIG. 1). However, FIG. 2 represents nuller 30 in an analog context for ease of discussion purposes. Like components in all Figures retain the same reference identifiers. A sine term 50 and cosine term 52 (identified as separate channel signals) are injected as feedforward signals into the track-follow loop (servo control loop) for identifying and reducing the amplitude of the n-around component signal. The terms are as follows:

$\zeta_1 = A^* \sin(\omega t)$ $\zeta_2 = B^* \cos(\omega t)$ where:

$\zeta_1$ and $\zeta_2$ (si) are the resultant signals, respectively,

A is the feedforward sine signal (FeedForSin) taken from nuller channel output signal $Y_1$ (further defined later), B is the feedforward cosine signal (FeedForCos) taken from nuller channel output signal $Y_2$ (further defined later), ω (omega) is angular frequency, and t is time.

The terms are summed 42 with the resultant signal from compensator 28. The rest of the servo system 54 contributes a certain magnitude M and phase θ (theta) to these components to produce feedback signal X(t) at nuller 30. Signal X(t) is defined as such because we are working with an analog analogy in FIG. 2, as previously mentioned. However, X(t) generally equates to signal X(n) of FIG. 1 in the digital context. M is at an angle −θ (or it could be +θ), and M and θ equate to the transfer function of the servo loop as seen by nuller 30. The Fourier sum is then taken of X(t) at the n-around frequency, 60, 62, and integrated 56, 58 to produce the proper nuller output $Y_1$ and $Y_2$. Signal $Y_1$ is processed through the servo loop as the FeedForSin element A (shown at 50), and $Y_2$ is processed through as the FeedForCos element B (shown at 52). Taking the "Fourier sum" at the n-around frequency translates into obtaining the sine and cosine coefficients of the n-around component (frequency). This Fourier sum is represented in the analog notation of FIG. 2, respectively at 60 and 62, by the multiplication of the signal X(t) by:

$$\sin(\omega t + \alpha) \text{ and}$$

$$\cos(\omega t + \alpha),$$

where α is a phase delay signal key to the present invention and determined by steps later described herein. Assume α=0 for now.

In order to mathematically describe unstable behavior of nuller 30, a transfer function must be derived from $\zeta_1$ to $Y_1$ and from $\zeta_2$ to $Y_2$, as follows:

$$Y_1 = \int [AM\sin(\omega t - \theta) * \sin(\omega t) + BM\cos(\omega t - \theta) * \sin(\omega t)] dt \quad (1)$$

$$Y_2 = \int [AM\sin(\omega t - \theta) * \cos(\omega t) + BM\cos(\omega t - \theta) * \cos(\omega t)] dt \quad (2)$$

If the dynamics of the system are such that θ=90 degrees, then equations (1) and (2) can be reduced to:

$$Y_1 = \int [-AM\sin(\omega t) * \cos(\omega t) + BM\sin^2(\omega t)] dt \quad (3)$$

$$Y_2 = \int [BM\sin(\omega t) * \cos(\omega t) - AM\cos^2(\omega t)] dt \quad (4)$$

If the integration is done over one period of the n-around frequency, then equations (3) and (4) can be found to be:

$$Y_1 = BM\pi \quad (5)$$

$$Y_2 = -AM\pi \quad (6)$$

Referencing FIG. 2 again, it should be noted that there is a linear relationship between A and $Y_1$. However, equations (5) and (6) identify that the system is uncontrollable and not linear. Namely, changes in A do not affect $Y_1$ directly, and changes in B do not affect $Y_2$ directly. Rather, changes in A cause a "cross talk" effect to $Y_2$, and changes in B cause a cross talk effect to $Y_1$. Similar results occur when θ=270 degrees. This "cross talk" explains why the system has stability problems at those lag terms.

The present invention resolves these instability problems by maximizing the feedforward channel separation (orthogonality), i.e., maximizing the independence of the signals from each other. More specifically, the present invention is a method of determining a value for the phase delay α such that $Y_1$ and $Y_2$ are forced to respond orthogonally (separately and independently) relative to changes in $\zeta_1$ and $\zeta_2$ respectively. In other words, for a determined value α, a feedforward signal change at A must affect $Y_1$ only, and a feedforward signal change at B must affect $Y_2$ only, thereby minimizing cross talk and instability problems.

The requirement of orthogonality hints at the solution provided by the present invention. Specifically, if a change is made to A, and $Y_2$ is perturbed from its equilibrium point, then we want to adjust α so that this change is minimized. In this context, α (or the equation in which α is used for signal injection) represents an "adaption" signal value for modifying the feedback signal. Accordingly, the present invention adapts the phase of the feedback correction 60 and 62 (by modifying the phase delay or "adaption" signal α) in order to make the feedforward sine 50 and feedforward cosine 52 terms orthogonal.

For simplicity of discussion, this disclosure refers to adapting the phase of the feedforward sine signal and then observing the response of the feedforward cosine signal. However, it is equally obvious that the feedforward cosine signal could be adapted while observing the response of the feedforward sine signal.

Figure 3:
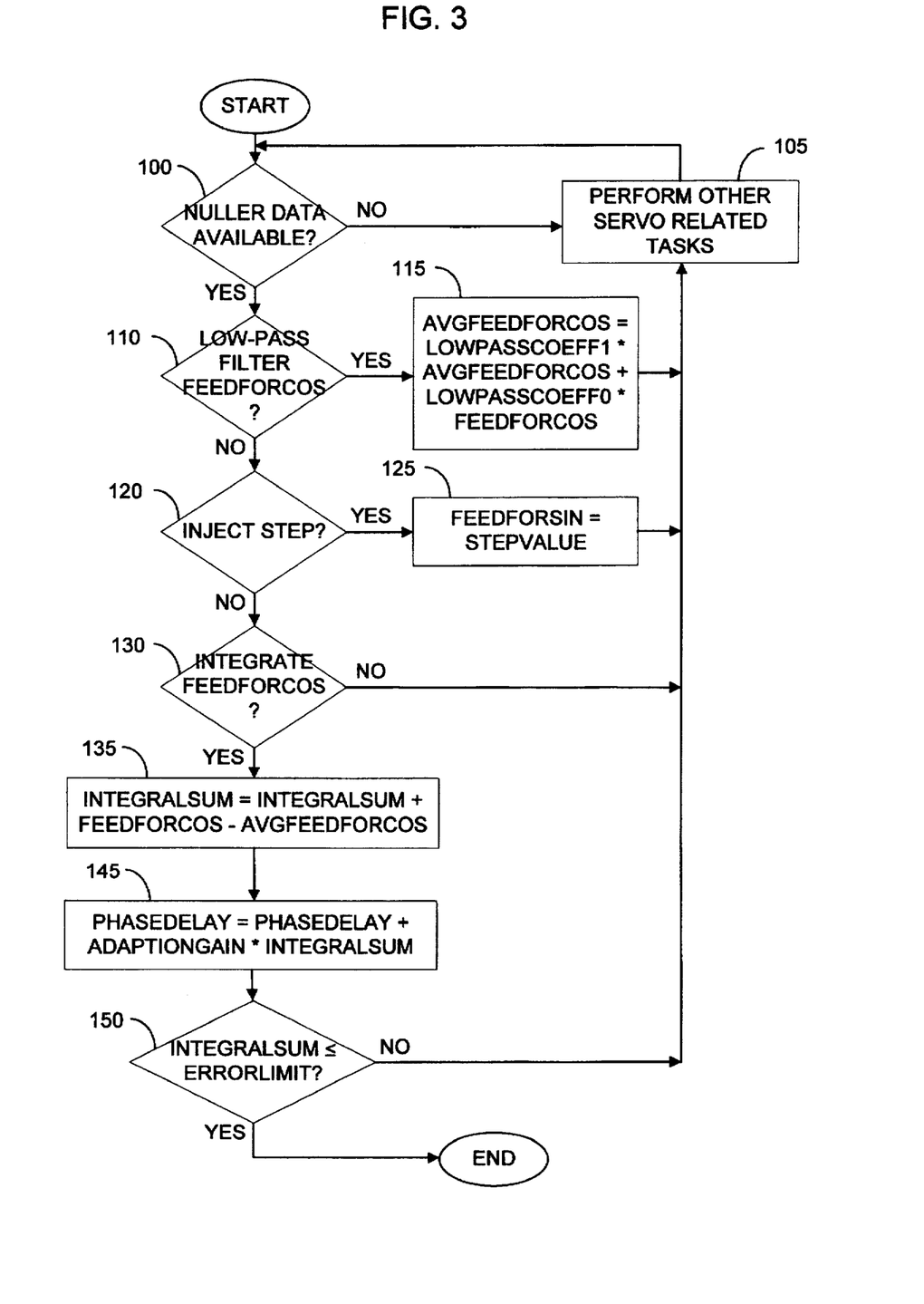
FIG. 3 is a flow chart depicting a preferred method of the invention.

Referring now to FIG. 3, a flow chart depicts a preferred method of the present invention for maximizing feedforward orthogonality in a servo system nuller. First, we must be sure nuller data is available 100. Specifically, a track may consist of position (servo) data and user data. With regard to servo data, for example, it is not uncommon to provide 68 servo position samples in certain conventional disk drives. Thus, after every 68 samples, the Fourier sum (in a digital context here) can be calculated at a particular n-around frequency for the previous revolution indicating valid nuller data is available. The samples are easily monitored with, for example, a counter. As such, when the counter indicates a disk rotation has occurred, the data is available. Otherwise, other normal servo related tasks are performed 105 to maintain the servo system tracking properly as conventionally occurs.

Once the nuller data is available, the next step 110 is to low-pass filter FeedForCos in order to find the average value (AvgFeedForCos). The filter 115 is represented as follows:

$$\text{AvgFeedForCos} = \text{LowPassCoeff1} * \text{AvgFeedForCos} + \text{LowPassCoeff0} * \text{FeedForCos}$$

where LowPassCoeff1 is picked in such a way that the low-pass filter has unity dc gain, thus:

$$\text{LowPassCoeff1} = 7/8, \text{ and}$$

$$\text{LowPassCoeff0} = 1/8.$$

Upon completion of low-pass filtering, a step value is fed into FeedForSin by setting FeedForSin to a StepValue 120, 125 (i.e., by altering the value of A in the feedforward sine equation) and then letting it return to its steady state value. The StepValue is arbitrarily chosen such that a significant effect occurs to the signal. The step response of FeedForCos is then observed.

At this point, the step response (FeedForCos) is integrated 130, 135 to evaluate how much "cross talk" there is between the two channels. However, the average value is subtracted first in order to remove the bias. The equation (in a digital context) describing this process is:

$$\text{IntegralSum} = \sum_{n=1}^{n=N} (\text{FeedForCos}(n) - \text{AvgFeedForCos})$$

A time counter is established (not shown) in order to monitor actual integration time and avoid over processing.

Once the IntegralSum is found, it is used as a feedback element in order to tune α. Thus, let α=phase delay–PhaseDelay(n), and the new phase delay, PhaseDelay(n+1), is calculated 145 by:

$$\text{PhaseDelay}(n+1) = \text{PhaseDelay}(n) + \text{AdaptionGain} * \text{IntegralSum} + (\tfrac{1}{2})\text{LSB}$$

where AdaptionGain is a design parameter constant that adjusts the convergence rate (i.e., the number of iterations) to the final PhaseDelay value. The constant is determined such that convergence is fast enough so as to not waste time, yet not too fast so as to avoid instability. LSB is the least significant bit (½ LSB is used to round up the resultant value). Essentially, the adaption uses an integrator to find the correct phase value α. Further, PhaseDelay is a number within the given range of servo position samples in the disk drive. For example, if the number of servo position samples is 68, then PhaseDelay will also be within that range.

Finally, IntegralSum is checked 150 to verify when it is less than or equal to a predefined error limit (threshold), thus indicating that orthogonality is maximized and the servo system nuller instability is minimized. The error limit threshold is also a design parameter constant (or range) indicative of completion of the process of maximizing orthogonality.

Figure 4:
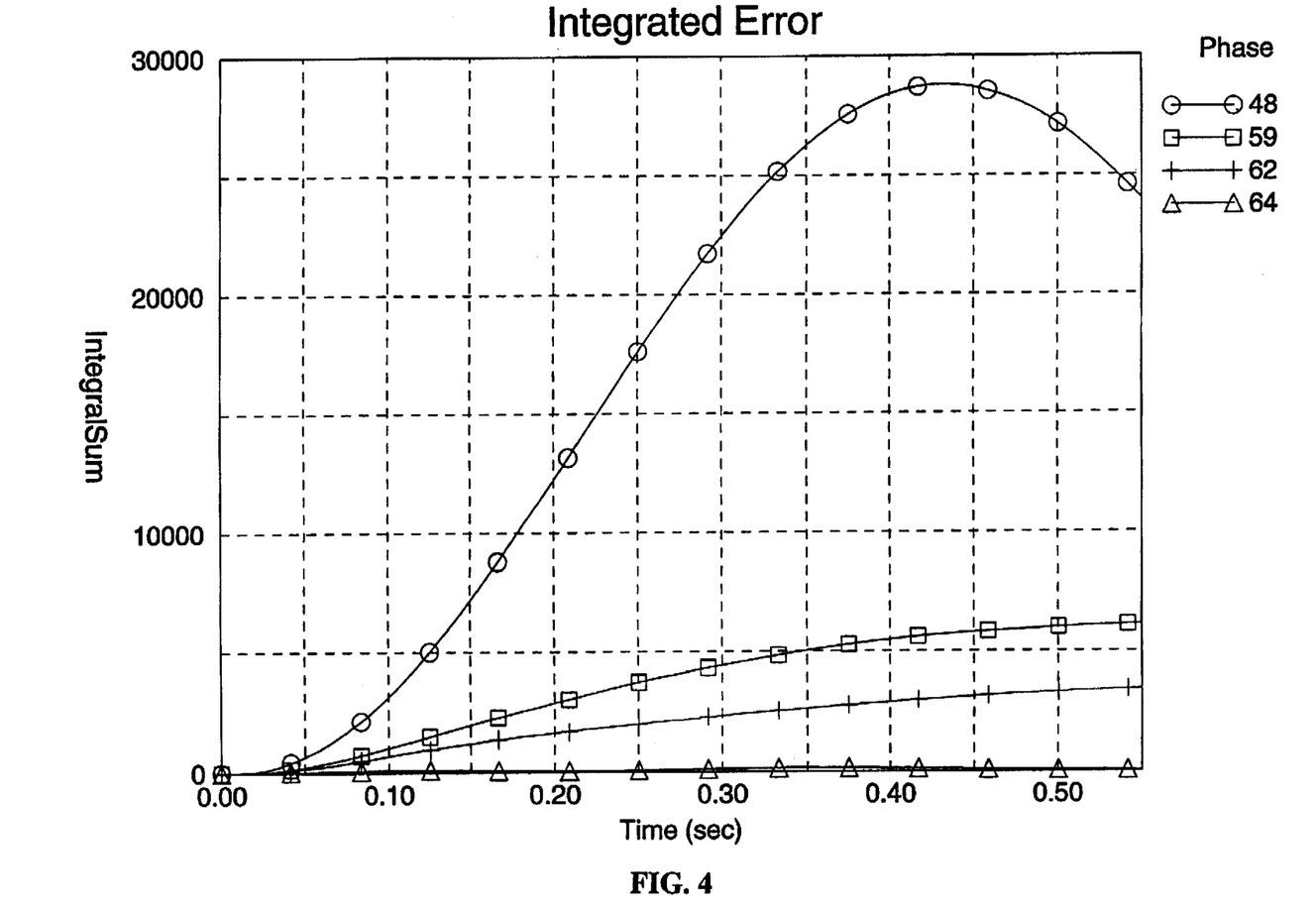
FIG. 4 is a chart graphing integrated error numbers over various injected phase values.
Figure 5:
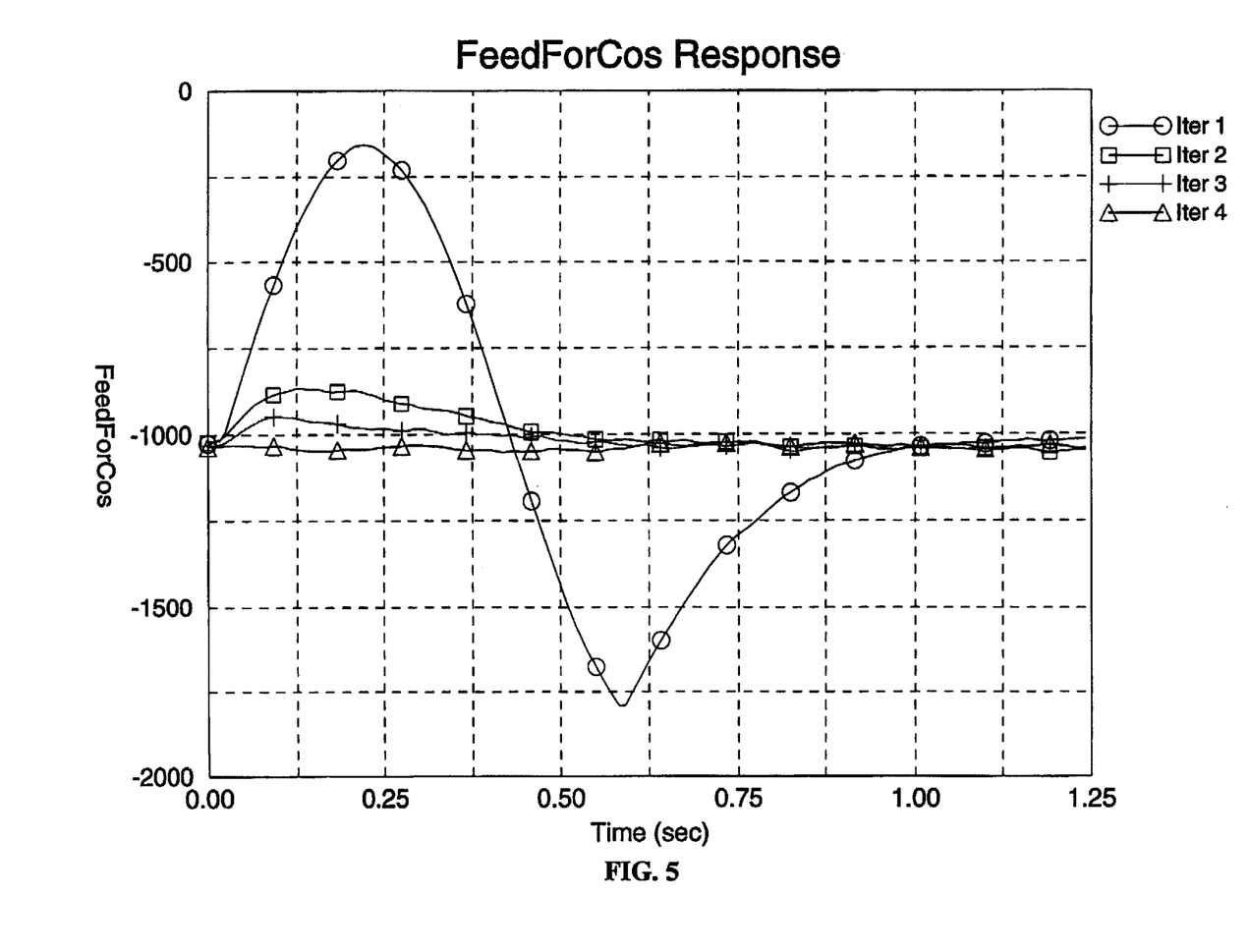
FIG. 5 is a chart graphing FeedForCos response signals over various iterations.

Referring now to FIGS. 4 and 5, FIG. 4 is a graph showing integrated error values over various injected phase values, and FIG. 5 is a chart graphing FeedForCos response signals over various iterations. These two graphs are indicative of the present invention method at work. Specifically, Iteration (Iter) 1 of FIG. 5 shows that there is a large response in FeedForCos for a step input in FeedForSin. This is also evident in IntegralSum (phase 48) of FIG. 3. However, as is clearly evident, the nuller system is tuned at iteration 4, and IntegralSum is negligible when PhaseDelay=64 (64 being a number within the 68 possible position samples for this example).

Finally, although it is obvious to one of ordinary skill in the art that numerous firmware code implementations may be utilized to accomplish the nuller of the present invention, the following is a preferred example as implemented in TI C25 DSP Assembly Language:

```
;(c) Copyright 1996 Hewlett Packard Company
;
;
;This subroutine adapts the phase of the feed-forward correction in order to make
;the FeedForSin and FeedForCos orthogonal.
;A track consists of position (servo) and user data. For this particular drive implementation,
;68 position samples are provided. Thus, every 68 samples, one can calculate the Fourier sum
;for the previous revolution. SampleCountL is a counter that ranges from 0 to 67. When
;SampleCountL rolls over, valid nuller data is available.
;
;The algorithm begins by checking to see if SampleCountL is zero. If it is not, there is nothing
;left to do so we go and perform other necessary tasks that are required to maintain the servo
;system tracking properly.
AdaptFeedFor    LAC     SampleCountL            ;Only update once per revolution
                BNZ     EndAdaption
                BIT     BitFlags, 15-AverageLBit ;Check to see if we should be
                BBNZ    NoLowPass               ;learning the average value of the
                                                ;FeedForCos or adapting the phase.
;FeedForCos will be put through a low-pass filter in order to find the average value. The filter
;is represented in the z-domain by the equation
;
;       AvgFeedForCos= LowPassCoeff1 x AvgFeedForCos + LowPassCoeff0 x FeedForCos
;
;LowPassCoeff1 is picked in such a way that the low-pass filter has unity dc gain. Thus,
;
;                       LowPassCoeff1 = 7/8     Q0
;for
;                       LowPassCoeff0 = 1/8     Q0
                LT      AvgFeedForCos           ;Q0
                MPY     LowPassCoeff1           ;Q15
                PAC                             ;Q15
                APAC                            ;LowPassCoeff1 x AvgFeedForCos Q16
                ADD     FeedForCos2,13          ;1/8 x FeedForCos        Q16
                SACH    AvgFeedForCos           ;Q0
                ZAC
                SACL    Counter                 ;Initialize counter
                SACL    IntegralSum             ;Initialize integrator
;Assert StepLBit and IntegrateLBit so an adaption iteration can be done when AverageLBit is
;deasserted.
                ZALS    BitFlags
                ANDK    0FFFFH-StepLMsk-IntegrateLMsk
                SACL    BitFlags
                B       EndAdaption
NoLowPass
;If the StepLBit is asserted, inject a step into FeedForSin. This is done by setting FeedForSin to
;Step Value and then letting it return to its steady state value.
                BIT     BitFlags,15-StepLBit    ;Should a step be injected?
```

-continued

```
            BBNZ    NoStep
            LAC     Step Value              ;Inject step
            SACL    FeedForSin
            LAC     Numb1,StepLBit          ;Set the StepLBit to false so that only one step
            ADDS    BitFlags                ;is done for each adaption iteration.
            SACL    BitFlags
            B       EndAdaption
NoStep
;If we get here, we are either in the process of integrating the step response of FeedForCos or we are
;done with the measurement.
            BIT     HidnBitFlags,15-IntegrateLBit   ;Should an integration step be done?
            BBNZ    EndAdaption
;At this point, the step response will be integrated. The average value will be subtracted first in order
;to remove the bias. The equation which describes this process is
```

$$IntegralSum = \sum_{n=1}^{n=N} (FeedForCos(n) - AvgFeedForCos)$$

```
            ZALH    FeedForCos              ;Subtract average value from step response
            SUBH    AvgFeedForCos           ;before doing integration.
            ADDH    IntegralSum             ;Do integration by doing a cumulative sum
            SACH    IntegralSum
            LAC     TimeCounter             ;Increment integral counter
            ADD     Numb1
            SACL    TimeCounter
            LAC     TimeCounter             ;Check to see if the integration time has
            SUBK    IntegrationTime         ;been exceeded.
            BLZ     EndAdaption
;The adaption uses an integrator to find the correct phase value. In this particular implementation,
;the phase (PhaseDelay) is a number between 0 and 67. Values in the range 0–33 represent lead terms
;and values 34–67 represent lag terms. The adaption equation
;
;       PhaseDelay = PhaseDelay + AdaptionGain × IntegralSum + ½ LSB
            ZALH    PhaseDelay              ;Do adaption calculation
            LT      IntegralSum
            MPY     AdaptionGain
            APAC
            ADD     Numb1,15                ;Add .5 LSB
            SACH    PhaseDelay              ;New learned phase value
            BLZ     NegPhase
            LAC     PhaseDelay              ;Check to see if the phase is greater than
            SUBK    67                      ;67.
            BLEZ    PhaseOK
            SACL    PhaseDelay              ;Fix phase so it is a number between 0
            B       PhaseOK                 ;and 67.
NegPhase    LAC     PhaseDelay              ;If phase is negative, wrap it around so
            ADDK    68                      ;it is a number between 0 and 67.
            SACL    PhaseDelay
PhaseOK
            LAC     Numb1,IntegrateLBit     ;Disable the integration process and
            ADDS    BitFlags                ;wait for the next adaption iteration.
            SACL    BitFlags
EndAaption  RET
;end of file
```

In summary, what has been described above are the preferred embodiments of a means and method for optimizing a nuller in a disk drive track-follow loop servo system by maximizing feedforward orthogonality in the nuller. While the present invention has been described by reference to specific embodiments, it will be obvious that other alternative embodiments and methods of implementation or modification may be employed without departing from the true spirit and scope of the invention.

What is claimed is:

1. A method of optimizing a track-follow loop signal in a disk drive servo system, the signal comprising separate channel feedforward signals and separate channel feedback signals, the method comprising the steps of:

(a) injecting a step signal into one of the separate channel feedforward signals;

(b) monitoring a response signal produced by the other of the separate channel feedforward signals in response to the injecting of the step signal; and, (c) in the event the response signal exceeds a predetermined threshold level, then further including the steps of:

(i) injecting an adaption signal into the separate channel feedback signals for producing output signals for modifying the respective channel feedforward signals and for reducing a next response signal upon a next injecting of a step signal; and, (ii) repeating steps (a) through (c), as necessary, with a modified adaption signal until the response signal is monitored to be within the predetermined threshold level.

2. The method of claim 1 wherein the separate channel feedforward signals are generated by injecting, respectively, sine and cosine terms into the track-follow loop signal.

3. The method of claim 2 wherein the sine term is represented by $A*\sin(\omega t)$, and the cosine term is represented by $B*\cos(\omega t)$, where A and B are the output signals of the respective channel feedback signals, $\omega$ is an angular frequency of the respective channel signal, and t is time.

4. The method of claim 1 wherein injecting the step signal includes modifying the output of one of the respective channel feedback signals.

5. The method of claim 1 wherein the adaption signal is represented by $\sin(\omega t+\alpha)$ for one of the channel signals, and $\cos(\omega t+\alpha)$ for the other of the channel signals, where $\omega$ is an angular frequency of the respective channel signal, t is time, and $\alpha$ is a phase delay signal or, in the event of repeating the steps with the modified adaption signal, $\alpha$ is a modified phase delay signal.

6. The method of claim 5 wherein the step of monitoring the response signal includes integrating the response signal to produce an integral sum for determining an amount of cross talk between the separate channel signals.

7. The method of claim 6 wherein the modified phase delay signal is determined by the equation:

$$\text{PhaseDelay}(n+1) = \text{PhaseDelay}(n) + \text{AdaptionGain} * \text{IntegralSum} + (\tfrac{1}{2})\text{LSB}$$

where PhaseDelay(n+1) is the modified phase delay signal, PhaseDelay(n) is a previous phase delay signal, Adaption-Gain is a design parameter constant for adjusting a convergence rate of the separate channel feedforward signals to a final phase delay value, IntegralSum is the integral sum value, and LSB is a least significant bit for rounding purposes.

8. The method of claim 1 wherein the predetermined threshold level is a value indicative of when signal separation for the separate channel feedforward signals is maximized for minimizing track-follow loop signal instability.

9. A computer-readable medium having computer executable instructions for performing the method of claim 1.

10. A method of optimizing an n-around nuller for a track-follow loop signal in a servo loop of a disk drive servo system, the signal comprising separate channel feedforward signals, and separate channel feedback signals, the method comprising the steps of:
    (a) injecting a step signal into one of the separate channel feedforward signals, whereby a response signal is generated at the other of the separate channel feedforward signals;
    (b) effecting a Fourier sum upon each of the separate channel feedback signals in connection with a predetermined phase delay signal for producing output signals for modifying the respective channel feedforward signals;
    (c) integrating the response signal to produce an integral sum for determining an amount of separation of the separate channel feedforward signals; and,
    (d) in the event the amount of separation of the separate channel feedforward signals is insufficient relative to a predetermined threshold, then further including the steps of:
        (i) determining a modified phase delay signal for increasing the separation of the separate channel feedforward signals; and
        (ii) repeating steps (a) through (d), as necessary, with the modified phase delay signal until the threshold is achieved, the threshold being indicative of a separation of the separate channel feedforward signals being optimized and nuller instability being minimized.

11. The method of claim 10 wherein the Fourier sum is effected by injecting into one of the respective channel feedback signals a signal represented by $\sin(\omega t+\alpha)$, and the other of the respective channel feedback signals a signal represented by $\cos(\omega t+\alpha)$, where $\omega$ is an angular frequency of the respective channel signal, t is time, and $\alpha$ is the phase delay signal or, in the event of repeating the steps with the modified phase delay signal, $\alpha$ is the modified phase delay signal.

12. The method of claim 11 wherein the modified phase delay signal is determined by the equation:

$$\text{PhaseDelay}(n+1) = \text{PhaseDelay}(n) + \text{AdaptionGain} * \text{IntegralSum} + (\tfrac{1}{2})\text{LSB}$$

where PhaseDelay(n+1) is the modified phase delay signal, PhaseDelay(n) is a previous phase delay signal, Adaption-Gain is a design parameter constant for adjusting a convergence rate of the separate channel feedforward signals to a final phase delay value, IntegralGain is the integral sum value, and LSB is a least significant bit for rounding purposes.

13. The method of claim 10 wherein the track-follow loop signal comprises a magnitude and phase described by a transfer function of the track-follow loop signal.

14. The method of claim 10 wherein one of the separate channel feedforward signals is represented by $A*\sin(\omega t)$, and the other is represented by $B*\cos(\omega t)$, where A and B are the output signals of the respective channel feedback signals, $\omega$ is an angular frequency of the respective channel signal, and t is time.

15. A computer-readable medium having computer-executable instructions for performing the method of claim 10.

16. A disk drive servo system comprising:
    (a) a track-follow loop signal having separate channel feedforward signals and separate channel feedback signals;
    (b) means for injecting a step value into one of the separate channel feedforward signals, whereby a step response signal is generated in the other of the separate channel feedforward signals;
    (d) means for monitoring the step response signal;
    (e) means for determining an adaption signal in response to the step response signal for reducing an amplitude of an n-around component of the track-follow loop signal; and,
    (f) means for injecting the adaption signal into the separate channel feedback signals for producing respective channel output signals for modifying the respective channel feedforward signals, wherein the respective channel feedforward signals are modified for improving separate channel signal separation and for reducing instability of the track-follow loop signal.

17. The system of claim 16 wherein one of the separate channel feedforward signals is represented by $A*\sin(\omega t)$, and the other of the separate channel feedforward signals is represented by $B*\cos(\omega t)$, where A and B are the respective separate channel output signals, $\omega$ is an angular frequency of the respective channel signal, and t is time.

18. The system of claim 9, wherein the adaption signal as injected into the separate channel feedback signals as described by $\sin(\omega t+\alpha)$ and $\cos(\omega t+\alpha)$ for each channel respectively, where $\omega$ is an angular frequency of the respective channel signal, t is time, and $\alpha$ is a phase delay signal value.

19. The system of claim 18 wherein the phase delay signal value is determined by the equation:

$$\text{PhaseDelay}(n+1) = \text{PhaseDelay}(n) + \text{AdaptionGain} * \text{IntegralSum} + (\tfrac{1}{2})\text{LSB}$$

where PhaseDelay(n+1) is the phase delay signal value, PhaseDelay(n) is a previous phase delay signal value, AdaptionGain is a design parameter constant for adjusting a convergence rate of the separate channel feedforward signals to a final phase delay value, IntegralSum is an integral sum value calculated by integrating the response signal, and LSB is a least significant bit for rounding purposes.

20. The system of claim 16, further including means for controlling the servo system such that the respective channel feedforward signals are modified for maximizing separate channel signal separation and for minimizing instability of the track-follow loop signal.

21. The system of claim 16, further including:
(a) means for low pass filtering the separate channel feedforward signal for which a step response is monitored for determining a respective average feedforward signal;
(b) means for reducing the step response signal by its respective average feedforward signal to produce a resultant value; and,
(c) means for integrating the resultant value for determining an amount of separation between the separate channel signals.

22. The system of claim 21 wherein the mean for low pass filtering provides unity dc gain.

* * * * *